(12) United States Patent
Champion et al.

(10) Patent No.: US 7,675,509 B2
(45) Date of Patent: Mar. 9, 2010

(54) METHODS AND APPARATUS FOR OPTICAL WIRELESS COMMUNICATION

(75) Inventors: Mark Champion, Kenmore, WA (US); Robert A. Unger, El Cajon, CA (US); Robert Hardacker, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1454 days.

(21) Appl. No.: 11/036,479

(22) Filed: Jan. 13, 2005

(65) Prior Publication Data

US 2006/0153572 A1 Jul. 13, 2006

(51) Int. Cl.
*G09G 5/00* (2006.01)
(52) U.S. Cl. .................. 345/204; 345/1.1; 345/2.1; 345/2.3
(58) Field of Classification Search ........... 345/204, 345/1.1, 2.1, 2.3
See application file for complete search history.

(56) References Cited

U.S. PATENT DOCUMENTS

| | | | |
|---|---|---|---|
| H247 H * | 4/1987 | Clark et al. ............... 701/4 |
| 5,905,914 A * | 5/1999 | Sakai et al. ............... 710/67 |
| 6,128,433 A * | 10/2000 | Gable et al. ............... 386/87 |
| 6,525,856 B1 * | 2/2003 | Maruyama et al. ........ 398/127 |
| 6,701,092 B2 | 3/2004 | Doucet et al. |
| 6,914,266 B2 | 7/2005 | Edwards et al. |
| 7,016,406 B1 * | 3/2006 | Phanse et al. ............. 375/232 |
| 7,209,874 B2 * | 4/2007 | Salmonsen ................. 703/23 |
| 2002/0118144 A1 * | 8/2002 | Edmonds .................. 345/1.1 |
| 2003/0214507 A1 | 11/2003 | Mawatari et al. |
| 2004/0080671 A1 | 4/2004 | Siemens et al. |
| 2004/0110468 A1 | 6/2004 | Perlman |
| 2004/0131186 A1 * | 7/2004 | Kasuya et al. ............. 380/255 |
| 2004/0217948 A1 | 11/2004 | Kawasaki et al. |
| 2005/0047447 A1 * | 3/2005 | Satoh et al. ............... 370/535 |
| 2005/0069130 A1 * | 3/2005 | Kobayashi ................ 380/201 |
| 2007/0061763 A1 * | 3/2007 | Matsumoto et al. ......... 716/4 |

* cited by examiner

*Primary Examiner*—Richard Hjerpe
*Assistant Examiner*—Leonid Shapiro
(74) *Attorney, Agent, or Firm*—Crowell & Moring LLP

(57) ABSTRACT

Methods and apparatus for optical wireless communication. In one embodiment, a wireless optical video system in which video content (e.g., DVI or HDMI) is transmitted wirelessly between a digital video source and a display device. This wireless optical communication is accomplished using a laser, encoded with the digital video data, directed from an optical transmitter to an optical receiver. In another embodiment, the data to be communicated includes high-definition video content.

28 Claims, 7 Drawing Sheets

METHODS AND APPARATUS FOR OPTICAL WIRELESS COMMUNICATION

FIELD OF THE INVENTION

The present invention relates generally to optical wireless communication, and in particular to wireless optical delivery of a video signal.

BACKGROUND

The preferred consumer digital video interfaces are High Definition Multimedia Interface (HDMI) and Digital Visual Interface (DVI). DVI is commonly used by PC equipment to drive digital video displays. DVI typically supports 24-bit RGB at video rates up to 165 MHz. A DVI driver accepts 24-bit RGB data and serializes it into three serial channels. The video clock is added as a fourth channel. As the RGB data is serialized, it is encoded using an 8b/10b encoding scheme called Transition Minimized Differential Signaling (TMDS). HDMI is backwards compatible with DVI. It supports alternate (non-RGB) color spaces and includes the ability to carry digital audio.

As with DVI, HDMI data is encoded to represent active video periods and control periods. In addition, HDMI includes a third entity called a Data Island. Data Islands are used to communicate additional data during the blanking interval. For example, data islands are used to send digital audio data in HDMI.

Data delivered using a DVI or HDMI interface may be encrypted using High-Bandwidth Digital-Content Protection (HDCP). Implementation of HDCP requires a set of unique secret device keys. During authentication, the receiver will only receive content once it demonstrates knowledge of the keys. Furthermore, to prevent eavesdropping and stealing of the data, the transmitter and receiver will generate a shared secret value that is consistently checked throughout the transmission. Once authentication is established, the transmitter encrypts the data and sends it to the receiver for decryption.

Heretofore, DVI/HDMI data has only been deliverable using hard wires due at least in part to the way the data source and the display device need to communicate with each other. However, it may be desirable for a consumer to want to place a display device (such as a flat-panel television) on a wall opposite from the video source (e.g., receiver or DVD player). In this case, the consumer would typically be required to purchase and install DVI cabling from the video source to the display. However, this may be both costly and present difficult installation issues.

A wireless radio frequency (RF) system could be used between a video source and a display device. However, there may be numerous reasons for preferring a wireless optical configuration between a digital video source and a display device. For example, the hardware required for an optical wireless signal may be less complex than a RF system. Moreover, a wireless optical solution is more secure since it will not penetrate walls as with an RF system.

Therefore, a wireless optical system which eliminates the need for cabling between a digital video source and a digital video sink may be desirable.

SUMMARY

Methods and apparatus for optical wireless communication are disclosed. In one embodiment, a system includes a video data source having a source output, an optical wireless transmitter to receive video data from the source output and encode the video data into a laser beam, and an optical wireless receiver to receive the laser beam and to extract the video data there from. The method further includes a display device having a destination input, wherein the display device receives the video data from the optical wireless receiver and presents a video display based on said video data.

Other aspects, features, and techniques of the invention will be apparent to one skilled in the relevant art in view of the following detailed description of the invention.

DETAILED DESCRIPTION OF THE EXEMPLARY EMBODIMENTS

One aspect of the invention is to provide a wireless optical video system in which video content (e.g., DVI or HDMI) is wirelessly transmitted between a digital video source and a display device. In one embodiment, this wireless optical communication is accomplished using a laser, encoded with the digital video data, directed from an optical transmitter to an optical receiver. In another embodiment, the data to be communicated includes high-definition video content.

Another aspect of the invention is to use a collimating lens to focus a wireless optical signal onto the focusing lens of a receiver. While in one embodiment, the laser beam to be transmitted is between approximately ¼ inch to approximately ½ inch, it should equally be appreciated that the beam may equally have a thicker or thinner diameter.

Another aspect of the invention is to provide the video data to the display at the same resolution and with the same video clock speed as that of the video source. For example, HDMI and DVI provide a mechanism for the video source to query the video sink as to what video formats are supported. Once queried, the video source may select the "best" video format for sending video data to the display. This selected video format may then be passed from the video source, through a wireless optical link, and on to a display device.

In one embodiment, the invention also makes use of a control channel communication system to enable DVI and HDMI content to be transmitted wirelessly. Heretofore, DVI/HDMI data has only been deliverable using hard wires given that the data source and the display device are required to actively communicate with each other. In one embodiment, this control channel communication system is provided by a low data-rate 2.4 GHz RF link. It should further be appreciated that a control-channel communication system may be implemented with an alternate technology, such as for example an Infrared optical communication link.

While much of the following description is in terms of HDMI/DVI content and system components, it should equally be appreciated that the principles of the invention are not limited and such, and may be applied to any other type of video content, such as serial digital interface (SDI) and high-definition serial digital interface (HD SDI).

Figure 1:
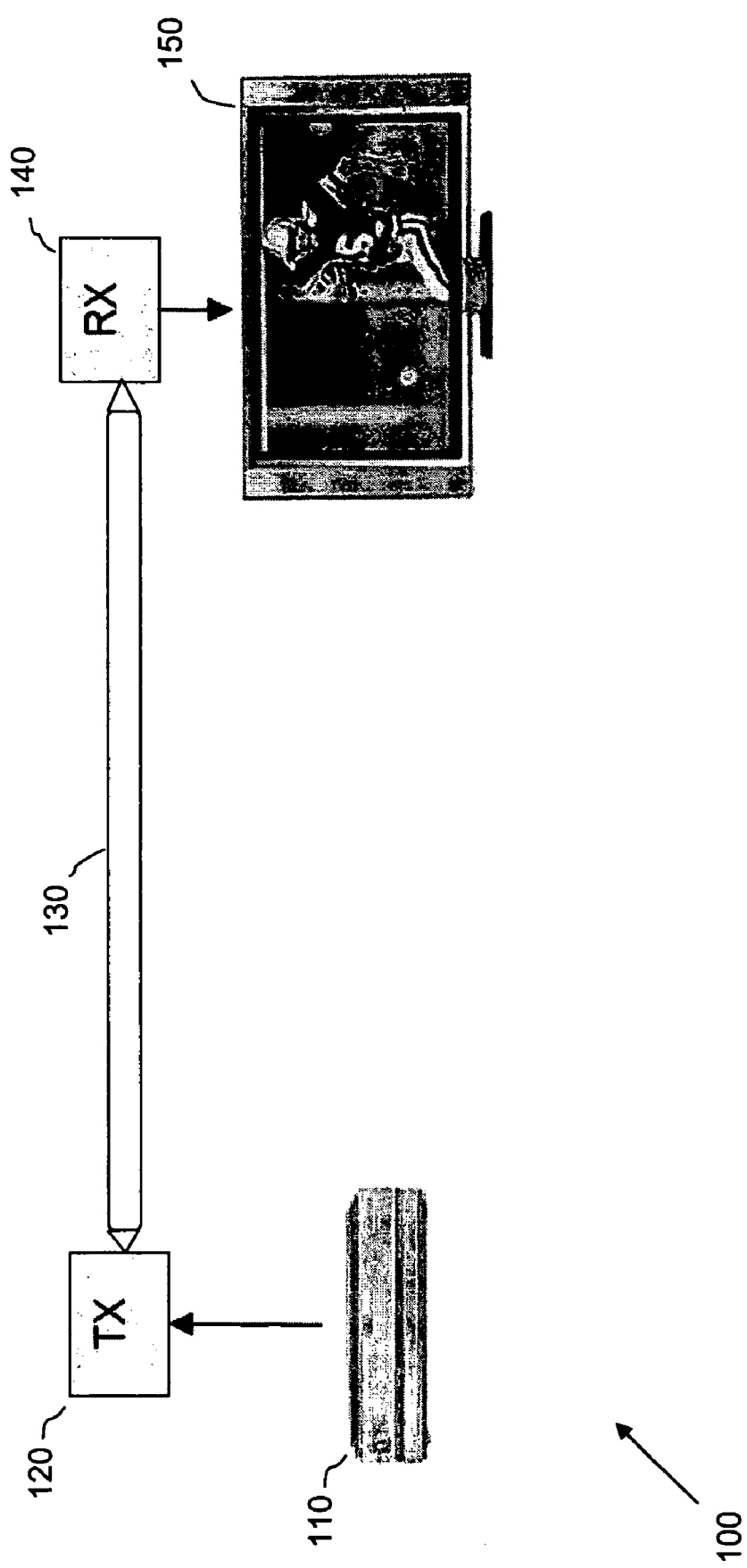
FIG. 1 is one embodiment of a system level diagram for a digital video system in accordance with the principles of the invention.

Referring now to FIG. 1, depicted is a digital video system 100 usable to implement one or more aspects of the invention. As depicted in FIG. 1, a video source 110 may be coupled to an optical transmitter 120. In one embodiment, the video source is an HDMI/DVI video source, such as an ATSC tuner, DVD player, etc. In another embodiment, the video source 110 is a high-definition video source. In still another embodiment, the video source 110 may be any known video source (e.g., HD SDI, 1080i, 720p, 480p, 480i, standard definition, etc.). Moreover, the signal provided to the optical transmitter 120 by the video source 110 may be encrypted with a copyright protection protocol, such as High-bandwidth Digital Content Protection (HDCP).

Continuing to refer to FIG. 1, in one embodiment the video source 110 provides video data to the optical transmitter 120, which in turn provides a wireless optical signal 130 to optical receiver 140. As will be described in more detail below, this optical signal 130 may be encoded with the video data being provided by the video source 110. In one embodiment, the optical signal 130 contains uncompressed high-definition video data. Once the video data is received by receiver 140, it may be decoded for display device 150.

Figure 2:
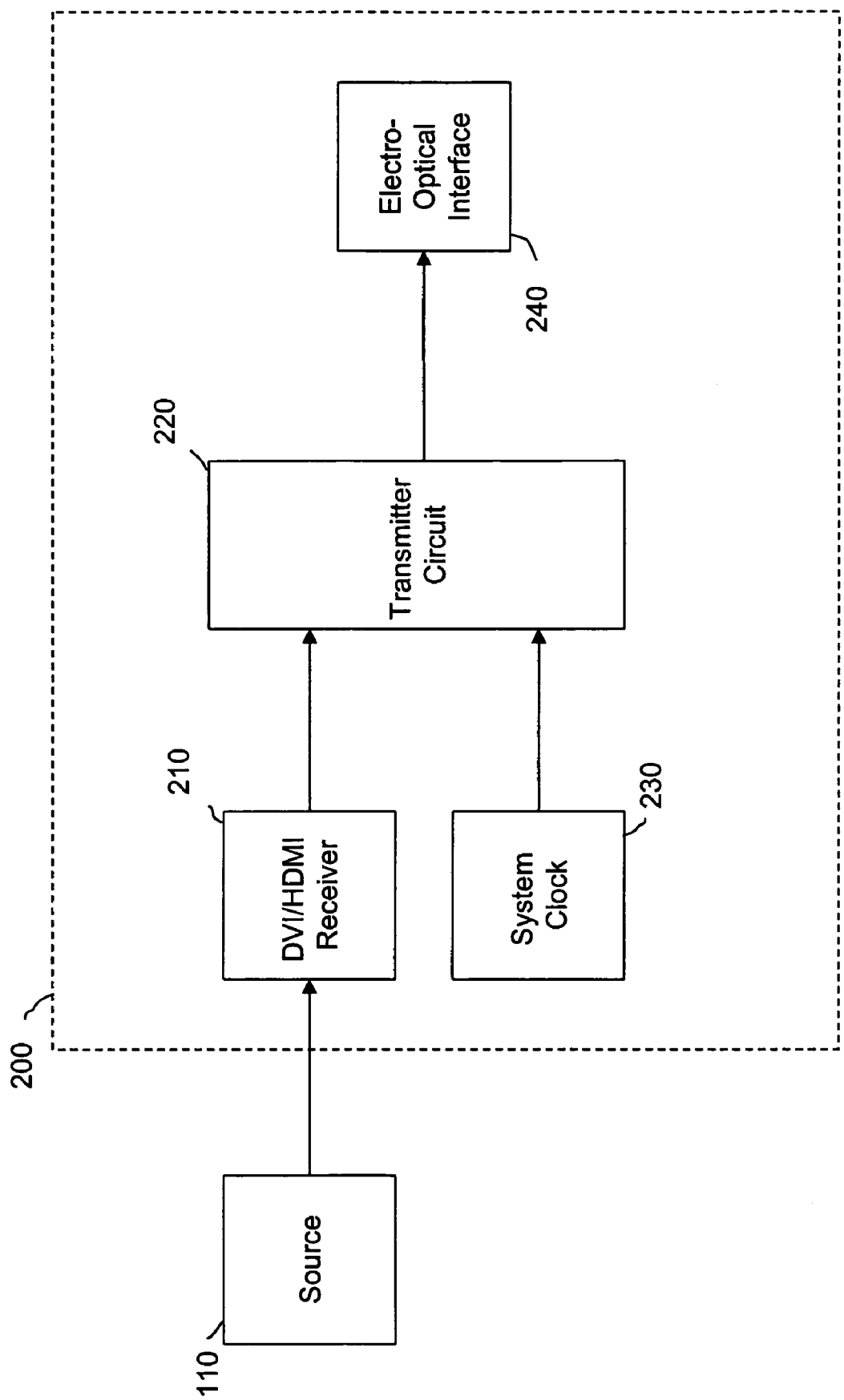
FIG. 2 is one embodiment of an optical transmitter capable of carrying out one or more aspect of the invention.

Transmitter 200 of FIG. 2 is a more detailed diagram of one embodiment of the optical transmitter 120 of FIG. 1. Transmitter 200, which receives the video signal from data source 110, is depicted as including a DVI/HDMI receiver 210, a transmitter circuit 220, a system clock 230 and a transmitter electro-optical interface 240. While in one embodiment, the data source 110 is an HDMI or DVI video source (e.g., ATSC tuner, DVD player, etc.), it may similarly be another type of data source.

As depicted in FIG. 2, the data source 110 provides a digital signal to the DVI/HDMI receiver 210. The DVI/HDMI receiver 210 may be used to convert the DVI/HDMI digital signal from the data source 110 into a digital video signal, such as 24-bit RGB. DVI/HDMI receivers are known in the field and beyond the scope of this disclosure. In another embodiment, the DVI/HDMI receiver 210 and the transmitter circuit 220 may be combined into a single logical circuit. While in one embodiment, the transmitter circuit 220 is a Field Programmable Gate Array (FPGA) or an Application-Specific Integrated Circuit (ASIC), it may similarly have other implementations. The other input for the transmitter circuit 220 comes from the system clock 230, which provides a clock signal. In one embodiment, this clock signal is a 110 MHz signal. The output of the transmitter circuit 220 is to a transmitter electro-optical interface 240. One embodiment of the transmitter circuit 220 will be described in more detail below with reference to FIG. 4, while one embodiment of the transmitter electro-optical interface 240 is described in more detail below with reference to FIG. 5.

Figure 3:
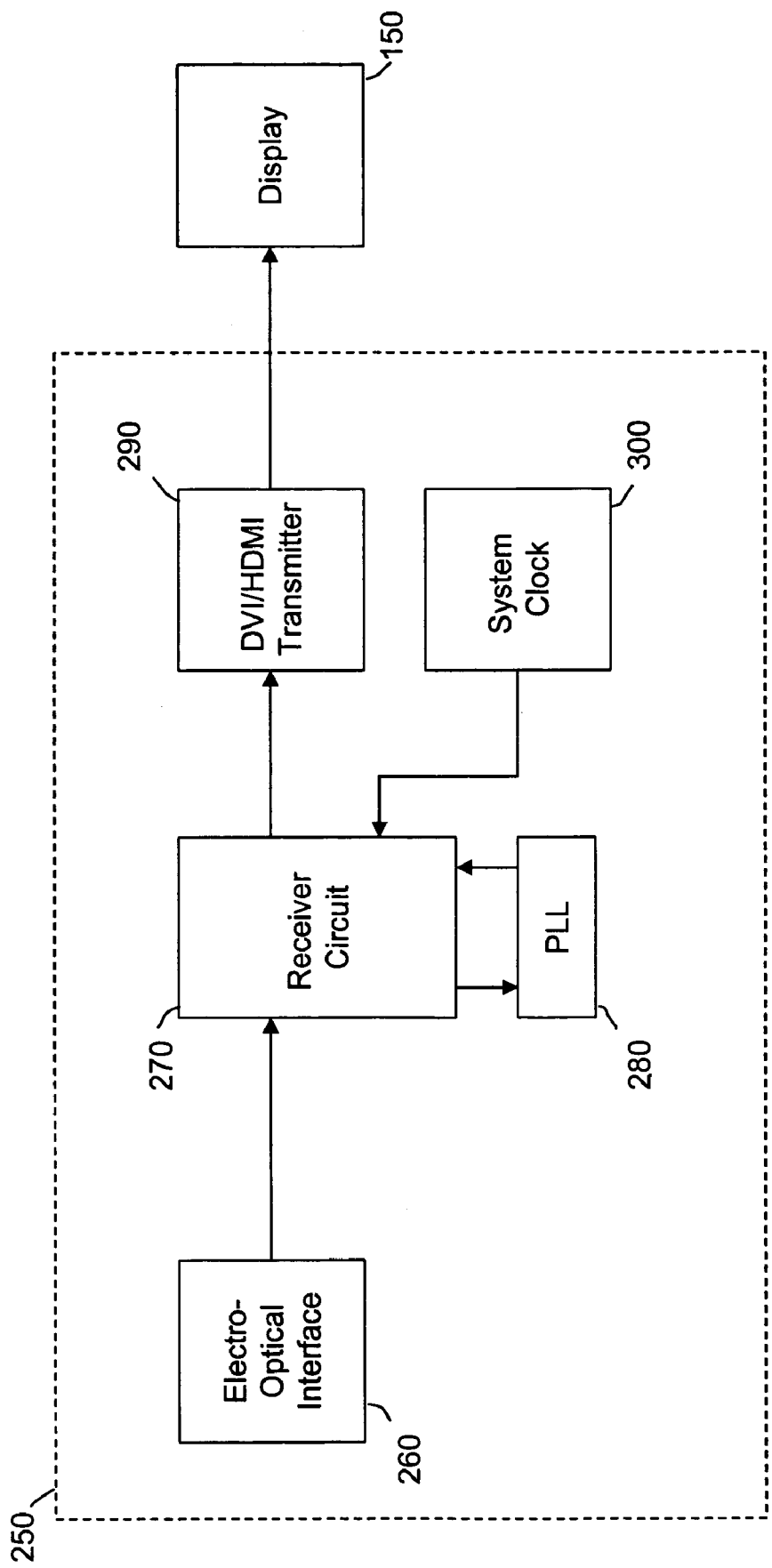
FIG. 3 is one embodiment of an optical receiver capable of carrying out one or more aspect of the invention.

Receiver 250 of FIG. 3 is a more detailed diagram of one embodiment of the optical receiver 140 of FIG. 1. In this embodiment, optical receiver 250, which receives the optical signal 130 from optical transmitter 120, is depicted as including a receiver electro-optical interface 260, a receiving circuit 270, a phase lock loop (PLL) 280, a DVI/HDMI transmitter 290, and a system clock 300. The optical transmitter 250 is further depicted as outputting video data to display device 150. While in one embodiment, the digital video data output to the display device 150 is one of HDMI and DVI data, it may similarly be another type of data.

As depicted in FIG. 3, the optical receiver 250 includes a DVI/HDMI transmitter 290, the details of which are known in the field and beyond the scope of this disclosure. In another embodiment, the DVI/HDMI transmitter 290 and the receiver circuit 270 may be combined into a single logical circuit. As mentioned above, another input to the receiver circuit 270 comes from the system clock 300, which provides a clock signal. In one embodiment, this clock signal is a 110 MHz signal. The transmitter circuit 270 is further depicted as being in communication with PLL 280, which may be used to help regenerate the video clock of the DVI/HDMI transmitter 290.

Figure 4:
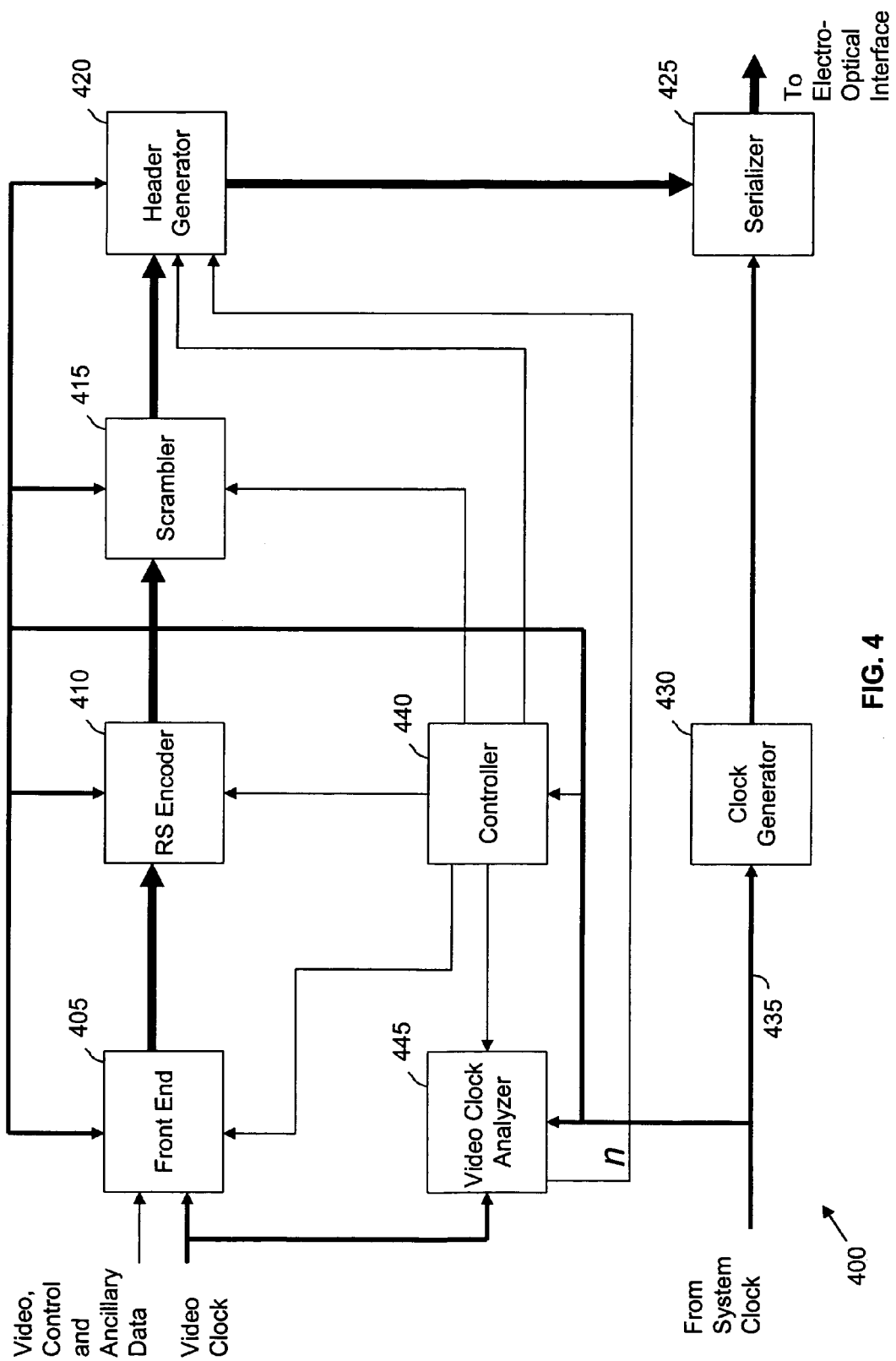
FIG. 4 is a more detailed diagram of the transmitter circuit of FIG. 2.

Referring now to FIG. 4, depicted is a block diagram of one embodiment of the transmitter circuit of FIG. 2. In this embodiment, transmitter circuit 400 includes a front end 405 which may be used to receive digital video data (such as 24-bit RGB) with control data from HDMI/DVI receiver 210, and optional ancillary data. The front end 405 may then output a near continuous stream of data to the optional RS (Reed-Solomon) Encoder 410. In one embodiment, this data is a 20-bit stream output at 110 MHz. If the incoming video data rate is insufficient to satisfy the RS Encoder 410, null words may be generated such that the RS Encoder 410 is never starved for data. In one embodiment, the RS Encoder 410 may be comprised of two 10-bit encoders that apply an RS code of (216,200). The RS Encoders 410 may each accept 200 10-bit words of data and add 16 words of forward error correction (FEC) data. This coding scheme enables the receiver to correct up to eight errors in each RS block of 216 words. In another embodiment, forward error correction may not be performed.

The RS Encoder may then output the data to the scrambler 415, which randomizes the data. The scrambler 415 may randomize the data to ensure that frequent transitions occur in the data stream. Frequent transitions help the receiver 270 synchronize itself to the 2.2 GHz bit clock and recover the data. In one embodiment, the scrambler 415 may use a pseudo-random number (PRN) generator to create a 20-bit random number for each 20-bit word. The incoming word is exclusive-OR'ed with the random number to produce a scrambled output. As will be described below, an identical PRN generator may be used on the receiver-side to unscramble the data.

The header generator 420 may be used to output a word header. For example, in one embodiment, every 20 uS the header generator 420 may output a 40 word header. A first portion of this header (e.g., first 20 words) may be comprised of preset data used to synchronize the receiver, followed by a second portion (e.g., next 20 words) of variable data, which can include control information for the receiver-side.

The serializer 425 receives the data stream from the header generator, according to one embodiment. The serializer 425 is used to accept the encoded data in parallel and shift it out a bit at a time. In one embodiment, the serializer 425 outputs a high rate video data stream to the transmitter electro-optical interface 240. The clock generator 430 synthesizes a clock (e.g., 2.2 GHz) used by the serializer 425 for shifting the parallel data though the system based on the clock signal 435 (e.g., 110 MHz) provided by a system clock (e.g., system clock 230). 2.2 GHz may be used when electro-optical system 500 is tuned to operate at this specific bit rate. A 2.2 GHz bit rate may be used because it is exactly 20 times the 110 MHz clock rate.

Continuing to refer to FIG. 4, the controller 440 may be used to synchronize the various components of the transmitter circuit 400. In one embodiment, it may inform the header generator 420 when to generate a header. It may also initialize the PRN generator in the scrambler 415. Moreover, the controller 440 may also start the RS Encoder 410 such that its output will be present at the proper time. In one embodiment, the controller 440 may also inform the front end 405 when data must be available to the RS Encoder 410. In the embodiment of FIG. 4, the controller 440 outputs a clock to the video clock analyzer (VCA) 445. The VCA 445 may be used to count the number of video clocks per time interval, with the resulting count "n" being transmitted to the receiver-side as part of the header's variable data. In one embodiment, "n" may be used on the receiver-side to regenerate the video clock.

Figure 5:
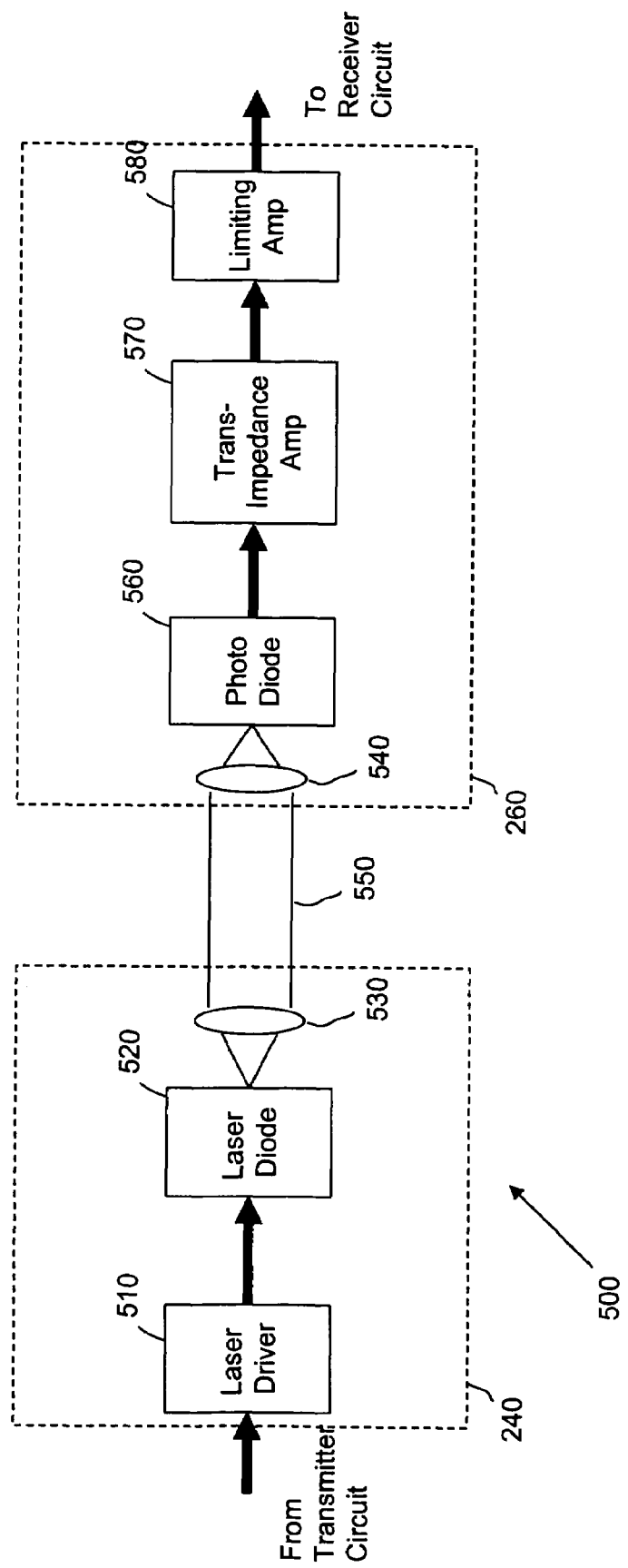
FIG. 5 is one embodiment of an electro-optical interface between the optical transmitter of FIG. 2 and the optical receiver of FIG. 3.

Referring now to FIG. 5, depicted is a block diagram of one embodiment of an electro-optical system 500, which includes the transmitting electro-optical interface 240 of FIG. 2 communicating with the receiving electro-optical interface 260 of FIG. 3. In this embodiment, the transmitting electro-optical interface 240 provides an optical signal 550 which is received by the receiving electro-optical interface 260. In this embodiment, the transmitting circuit 220 provides the video signal in the form of a digital electrical signal to the laser driver 510 which, in turn, generates a series of electrical potentials to the laser diode 520. This sequence of electrical potentials is used by the laser diode 520 to convert the signal into an optical signal 550. Moreover, a collimating lens 530 may be used to focus the optical signal 550 such that it is properly receivable by the receiving electro-optical interface 260.

A focusing lens 540 may be used to capture and focus the optical signal 550 onto a photo diode 560. The photo diode 560 receives and converts the optical signal 550 into a digital electrical signal which may then be passed to a trans-impedance amp 570 and then to a limiting amp 580.

Figure 6:
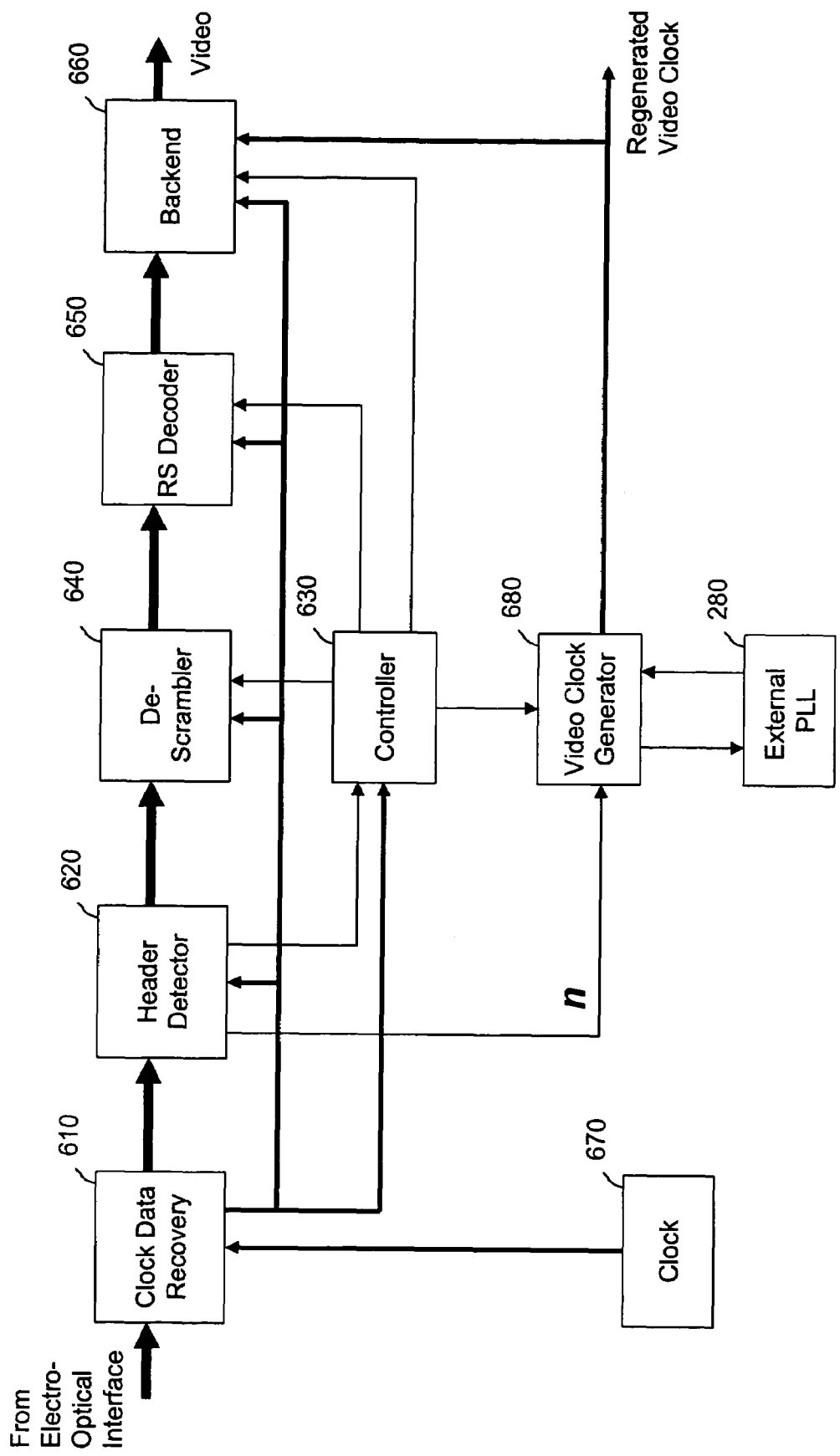
FIG. 6 is a more detailed diagram of the receiver circuit of FIG. 2.

Referring now to FIG. 6, depicted is a block diagram of a particular embodiment of the receiver circuit 270 of FIG. 3. In particular, data is received by the receiver circuit 600 into a clock/data recovery block 610 from the receiver electo-optical interface 260. In one embodiment, the function of the clock/data recovery block 610 is to extract the original transmit clock (e.g., 2.2 GHz) and divide it down to reproduce the transmitter's system clock 230 (e.g., 110 MHz) for use in moving the data through the receiver circuit 600. Moreover, clock/data recovery block 610 may also deserialize the data to determine where one word ends and the next begins within the serial data stream.

The header detector 620 may be used to search for the headers previously inserted by the transmitter circuit's header generator 420. When the header is found, the header detector 620 may signal the controller 630 to synchronize itself with the data stream. Once synchronized, the controller 630 may synchronize the other processing blocks in the receiver circuit 600.

The remaining processing blocks in the receiver circuit 600 are complementary to those in the transmitter circuit 400 of FIG. 4. For example, the descrambler 640 may contain a PRN generator that is initialized by the controller 630 at the proper time such that the data following the header is restored to its pre-scrambled values. The RS Decoder 650 is used to decode the data, followed by final processing and de-multiplexing by a back-end 660, which is complimentary to the previously-described front end 405. In one embodiment, the backend 660 is responsible for taking the data stream and extracting the original video and control data.

As previously mentioned, one aspect of the invention is to provide the video data to the display 150 at the same resolution and with the same video clock speed as that of the video source 110. For example, HDMI and DVI provide a mechanism for the video source 110 to query the video display 150 (sink) as to what video formats are supported. Once queried, the video source 110 may select the "best" video format for sending video data to the display 150. As will be described in more detail below, this query communication may be performed over an I2C link.

With that said, the electro-optical system 500 has no way of knowing what video format will be selected by the video source 110. For this reason, the electro-optical system 500 will be able to accommodate any arbitrary clock rate, according to one embodiment.

While it may be possible to first convert the incoming video data to a standard format having a predetermined video clock rate, such an additional conversion operation is undesirable due to the processing overhead and image distortion inherent in such a conversion process. Moreover, such a system would not be able to pass HDMI data due in part to the fact that the video conversion process necessarily modifies the video clock which would be needed by the display to extract data-islands in which audio information is embedded. In addition, such a system would not support the HDCP scheme. If the video data is encrypted, the display will not be able to decrypt the data without the original video clock.

Thus, in one embodiment, the video data is transmitted from the video source 110 through the electro-optical system 500 and to the display 150 in what ever format and with the appropriate video clock, as determined by the source 110. In one embodiment, this is accomplished by regenerating the video clock in the receiver 140. The flow of video data through the system is isochronous and the regenerated video clock must be phase-locked to the source's video clock. Video clock regeneration may be accomplished using a video clock counter in the transmitter (e.g., video clock analyzer 445) and a special PLL (e.g., PLL 280) in the receiver coupled to the video clock generator 680. At both the receiver and transmitter end, the same 110 MHz clock signal is used as a reference. This 110 MHz clock signal originates at the transmitter and is indirectly used to clock data across the wireless optical link. In the transmitter, the controller 440 divides the 110 MHz clock down to create a 50 kHz clock. This 50 kHz clock may then be used as a reference for the video clock analyzer 445. In the receiver, the controller 630 divides the 110 MHz clock down to create a 50 kHz clock. This 50 kHz clock is used as a reference for video clock generator 680. The video clock generator uses the 50 kHz reference clock and the "n" value to regenerate the original video clock.

As previously mentioned, one aspect of the invention is to use a control channel communication system to enable content (e.g., DVI and HDMI content) to be transmitted wirelessly. In one embodiment, this control -channel communication system is provided by a low data-rate 2.4 GHz RF link. Other embodiments may implement some of the control-channel functionality in the optical link.

In another embodiment, the RF link is used to perform required I2C queries of the display. I2C is an interface used to control components in consumer electronics. One application of I2C is HDCP (High-bandwidth Digital Content Protection) to exchange keys and other information over a DVI/HDMI cable between a source (i.e. DVD player) and a sink (i.e. display). I2C is a memory-bus-like protocol used over two wires to control components in consumer electronic systems. A master, such as a microcontroller, can write commands and read status from register locations in one or more slave devices. Buffering devices permit wired extensions but the memory bus nature of the protocol make real-time wireless extension difficult. Converting the connection to wireless requires preserving real time response with minimal data transfer latency.

Figure 7:
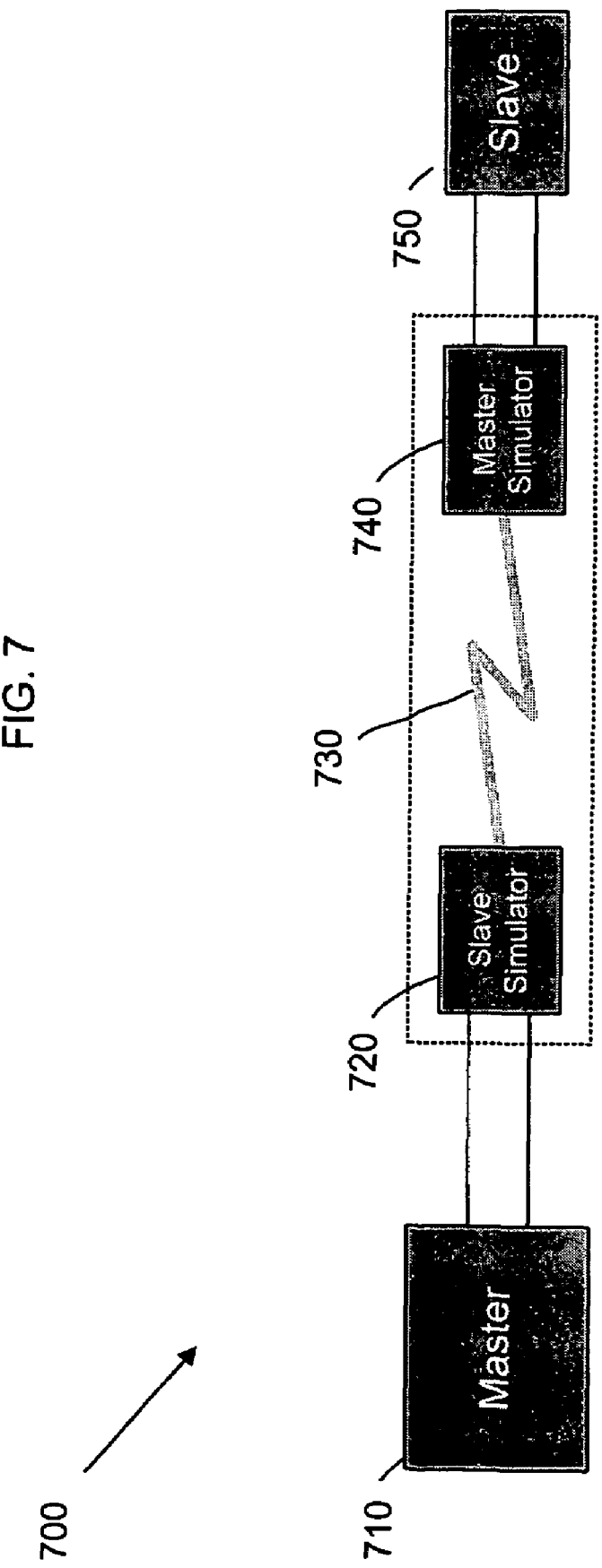
FIG. 7 is one embodiment of a control-channel system implemented in accordance with the principles of the invention.

Referring now to FIG. 7, depicted is one embodiment of how a control-channel communication system 700 may be implemented. In this embodiment, a master 710 communicates wirelessly through slave simulator 720, while a slave device 750 communicates wirelessly through master simulator 740. In one embodiment, the master is the transmitter 120, while the slave 750 is the receiver 140. Moreover, the components which comprise the slave simulator 720 and the master simulator 740 may be integrated, in whole or in part, with the transmitter 120 and receiver 140, respectively. Moreover, while in one embodiment wireless link 730 is a 2.4 GHz RF link, it should similarly be appreciated that it may be any other type of wireless link.

With writes from the master 710 to the slave 750, address and data information are simply relayed with a minimum of overhead. This involves capturing the writes with appropriate handshakes, wrapping the content into the wireless protocol, and reconstituting the write operation on the receiving side. In one embodiment, this may be implemented as a "store and forward" operation starting with the slave simulator 720 receiving the command, then passing it over the link to the master simulator 740, which in turn sends it onto the slave 750. A few milliseconds end-to-end delay may be introduced, but all protocol timing is met.

I2C reads expect immediate response. There is not sufficient time to send the read command over the link followed by return of the desired data. Thus, in one embodiment, a shadow memory may be used on each side. These memories may mirror what is found in the slave device registers. The slave side of the link may poll the device registers and maintain a local shadow copy. When a change of data is noted, updates may be sent over the link 730 to the master side shadow. This data may then be available to the master 710 on demand. In this manner, all I2C protocol timing is maintained and the master 710 has no idea it is not accessing the real device.

In another embodiment, shadow memory in the slave simulator 720 may be implemented as a dual port RAM and kept current by the master simulator 740. Any changes in the actual device data may be noted by the master simulator 740 with updates sent to the slave simulator 720.

As previously mentioned, a second shadow memory may be maintained in the master simulator 740 attached to the actual slave device 750. It may be used to store the reference values for determining when slave data has changed. The master simulator 740 may keep both memories current by polling the slave 750 through, for example, all possible sub-addresses or, alternatively, only touching the ones known to be volatile.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A combination wireless optical and radio frequency communication system comprising:
   a transmitter, coupled to a video data source having a source output, the transmitter comprising an optical wireless transmitter to receive video data from the source output and to encode the video data into a laser beam, the transmitter further comprising a receiver simulator having a first shadow memory, and wherein the transmitter further comprises an associated first radio frequency transceiver for sending a query for video format information, and for receiving, in response to the query, video format information corresponding to a preferred format of the display device; and
   a receiver, coupled to a display device, the receiver comprising an optical wireless receiver to receive the laser beam and to decode the video data therefrom, the receiver further comprising a transmitter simulator configured to,
   poll one or more device registers of a display device and
   send updates to the first shadow memory of the receiver simulator for access by the transmitter upon request, where said updates are based on information obtained from said polling of the one or more device registers.

2. The system of claim 1, wherein the transmitter and receiver engage in two-way communication over a control-channel radio frequency communication link to exchange encryption information to satisfy one or more digital interface queries.

3. The system of claim 1 wherein the transmitter simulator includes a second shadow memory for maintaining a local copy of the one or more device registers.

4. The system of claim 3, wherein the receiver and transmitter simulators, by virtue of having the first and second shadow memories, respectively, enable the transmitter and receiver to wirelessly communicate while still maintaining required protocol timing.

5. The system of claim 1, wherein the optical wireless transmitter is to encode said video data into a laser beam in accordance with the received video format information.

6. The system of claim 5, wherein the receiver further comprises an associated second radio frequency transceiver for receiving said query and for sending, in response to the query, requested video formation information to the first radio frequency transceiver.

7. A system comprising:
   a transmitter, coupled to a video data source having a source output, said transmitter having an associated first radio frequency transceiver for sending a query for video format information, and for receiving, in response to the query, video format information corresponding to a preferred format of a display device, wherein the transmitter further comprises an optical wireless transmitter to receive video data from the source output and encode said video data into a laser beam in accordance with the received video format information;
   a receiver, coupled to a display device, having an associated second radio frequency transceiver for receiving said query and for sending, in response to the query, requested video formation information to the first radio frequency transceiver, wherein the receiver further comprises an optical wireless receiver to receive said laser beam and to extract said video data therefrom for presentation by said display device;
   a receiver simulator coupled to the first radio frequency transceiver having a first shadow memory; and
   a transmitter simulator coupled to the second radio frequency transceiver, wherein the transmitter simulator is configured to poll one or more device registers and send updates to the first shadow memory of the receiver simulator for access by the transmitter upon request, where said updates are based on information obtained from polling of the one or more device registers.

8. The system of claim 7, wherein said optical wireless transmitter includes a laser diode and a collimating lens, and wherein said laser beam is generated using said laser diode and then directed using said collimating lens.

9. The system of claim 7, wherein said optical wireless receiver includes a focusing lens and a photo diode usable to receive said laser beam.

10. The system of claim 7, wherein said video data is transmitted from said optical wireless transmitter to said optical wireless receiver at a rate of approximately 2.2 Gbps.

11. The system of claim 7, wherein said optical wireless receiver is further to recover a video clock signal from said video data, wherein said video clock signal is generated by the optical wireless transmitter and encoded into said video data.

12. The system of claim 7, wherein said video data has forward error correction encoding applied to correct errors caused by sending said video data from said optical wireless transmitter to said optical wireless receiver.

13. The system of claim 7, wherein the first and second radio frequency transceivers are configured as a control-channel radio frequency communication link to enable said video data source to exchange information with said display device.

14. The system of claim 7, wherein said video data source and display device exchange encryption information over said control-channel radio frequency communication link to satisfy one or more digital interface queries.

15. The system of claim 7, wherein the receiver simulator is integrated with the first radio frequency transceiver, and the transmitter simulator is integrated with the second radio frequency transceiver.

16. The system of claim 7, wherein the transmitter simulator includes a second shadow memory for maintaining a local copy of the one or more device registers.

17. The system of claim 16, wherein the receiver and transmitter simulators, by virtue of having the first and second shadow memories, respectively, enable the transmitter and receiver to wirelessly communicate while still maintaining required protocol timing.

18. A method comprising:
receiving video data from a source having a source output;
sending a query for video format information over a control-channel radio frequency communication link;
receiving over the control-channel radio frequency communication link, and in response to said query, video format information corresponding to a preferred format of a display device;
encoding said video data into a laser beam in accordance with the received video format information;
transmitting said laser beam from an optical wireless transmitter to an optical wireless receiver;
receiving said laser beam by the optical wireless receiver to extract said video data therefrom;
providing said video data to a display device having a destination input;
polling one or more device registers of the display device; and
sending updates based on said polling over the control-channel radio frequency communication link to a first shadow memory local to the source for access by the source upon request.

19. The method of claim 18, wherein transmitting said laser beam comprises transmitting said laser beam using a laser diode and a collimating lens of the optical wireless transmitter.

20. The method of claim 19, further comprising generating said laser beam using said laser diode, and directing said laser beam to said optical wireless receiver using said collimating lens.

21. The method of claim 18, wherein transmitting said laser beam comprises transmitting said laser beam from the optical wireless transmitter to the optical wireless receiver, wherein said optical wireless receiver includes a focusing lens and a photo diode usable to receive said laser beam.

22. The method of claim 18, wherein transmitting said laser beam comprises transmitting said laser beam from said optical wireless transmitter to said optical wireless receiver at a rate of approximately 2.2 Gbps.

23. The method of claim 18, further comprising:
measuring a video clock signal by the optical wireless transmitter to provide a video clock measurement; and
encoding said video clock measurement into said video data.

24. The method of claim 18, further comprising recovering said video clock signal from said video data using said optical wireless receiver.

25. The method of claim 18, wherein said source output and display device exchange information over said control-channel radio frequency communication link to satisfy one or more digital interface queries.

26. The method of claim 18, further comprising applying forward error correction to said video data to correct errors caused by said transmitting said laser beam from the optical wireless transmitter to the optical wireless receiver.

27. The method of claim 18, further comprising storing data from the one or more device registers in a second shadow memory local to the display device.

28. The method of claim 18, wherein the control-channel radio frequency communication link enables wireless communication between the source and display device in accordance with required protocol timing.

* * * * *